Patented Oct. 10, 1933

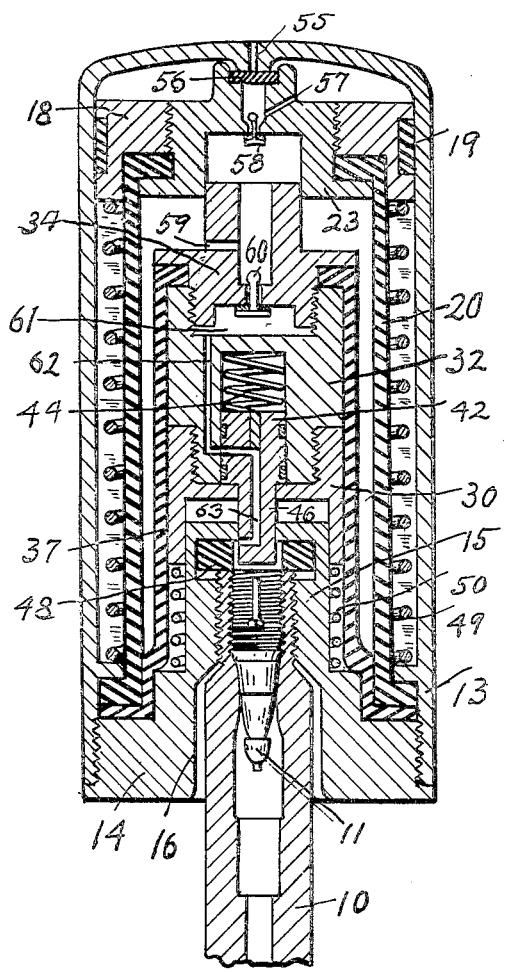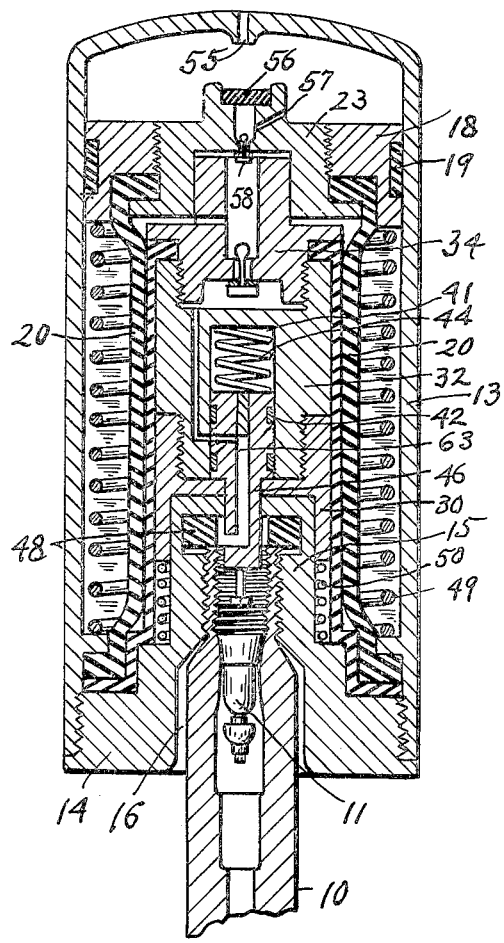

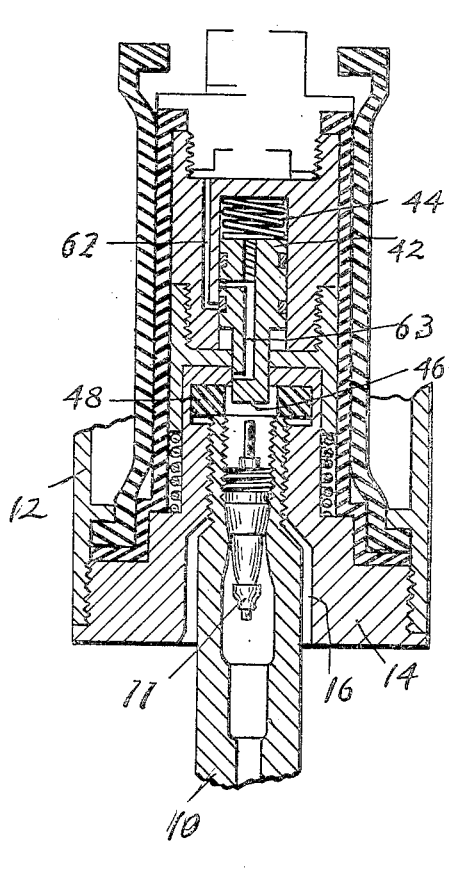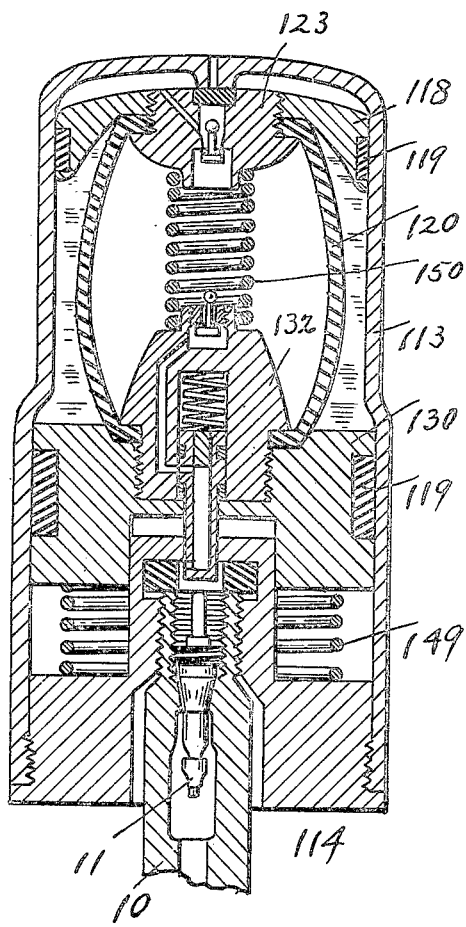

1,930,041

UNITED STATES PATENT OFFICE 1,930,041

TIRE INFLATING ATTACHMENT

John C. Crowley, Cleveland Heights, and Arthur P. Williamson, Cleveland, Ohio, assignors to The Dill Manufacturing Company, Cleveland, Ohio, a corporation of Ohio Application August 11, 1930. Serial No. 474,354

7 Claims. (Cl. 152—11)

This invention relates to tire inflating attachments, and more particularly to devices of this character which are connected to the tire valve stem and actuated by variations in centrifugal force due to changes in speed of the vehicle on which the tire is mounted.

It is an object of the present invention to produce a large amount of inflation from a comparatively small variation in the centrifugal force.

Another object of the invention is to employ the lateral contraction of a flexible wall to produce the desired inflation.

A further object of the invention is to employ hydraulic means for contracting the flexible wall.

Still another object of the invention is to provide the tire inflating attachment with means yieldable in response to a predetermined pressure, whereby over-inflation is prevented.

Further objects of the invention are to simplify and improve the construction and operation of devices of this character, to render them inexpensive to manufacture, substantially fool-proof, not likely to get out of order, and otherwise well adapted for the purposes set forth.

Other objects and features of novelty will be apparent as the following description proceeds, reference being had to the accompanying drawings in which Figure 1 is a section through the device according to the preferred embodiment of the present invention, showing the parts in a position of rest.

Fig. 2 is a view similar to Fig. 1 but showing the parts in their extreme position under the action of centrifugal force.

Fig. 3 is a view similar to Fig. 2, showing only a sufficient portion thereof to illustrate the position of the parts when the tire has been inflated to the desired predetermined pressure; and Fig. 4 is a view similar to Fig. 1, but showing a modified construction.

Referring more particularly to the drawings, the embodiments of the present invention are illustrated in connection with a tire valve stem 10, of customary or standard construction now in use for the inflation of pneumatic tires, and provided with the usual valve insides 11. The embodiments shown are adapted to be connected to the tire valve stem 10, and are preferably mounted thereon and carried thereby, being shown as in threaded engagement with the outer end of the tire valve stem.

The tire inflating attachment comprises a shell 13 and a base 14 having a central pedestal 15. The base is provided with a central bore 16 slightly larger than the stem 10, and having a portion of reduced diameter extending into the pedestal 15 and threaded so as to engage the threaded end of the tire valve stem.

Slidably mounted inside the shell 13 is a plunger 18, preferably constructed of metal or other heavy material, so that the same may have sufficient weight to develop considerable centrifugal force. Packing 19 is carried by a peripheral groove, in the plunger 18, so as to seal the plunger with respect to the shell 13.

A flexible wall 20 projects from the plunger 18, and defines therewith and with a base 14 a collapsible chamber. The walls 20 are preferably cylindrical and constructed of impervious material, which will permit repeated flexing of the walls and at the same time prevent the passage of gas or liquid therethrough. Rubber has been found very satisfactory for this purpose. One end of the wall 20 is secured to the plunger 18, and preferably sealed thereto so that the plunger 18 may form the end wall of the collapsible chamber. In the form shown, one end of the wall 20 is flanged inwardly and the plunger 18 has threaded therein a central plug 23 flanged outwardly to underlie the flange of the flexible wall 20 and clamp the same to the inner side of the plunger 18, thus forming a fluid tight joint.

The other end of the wall 20 is flanged outwardly and similarly clamped between the base 14 and a portion of the shell 13, the shell 13 and the base 14 having threading engagement to produce the desired clamping action so that the lower end of the flexible wall 20 is sealed to the base 14.

Slidable over the pedestal 15 is a skirt 30 which is threaded to a body portion 32. The upper end of the body 32 is recessed and threaded to receive a cap 34, an upwardly projecting, centrally apertured portion of which slidably engages a bore in the part 23 of the plunger 18. Fitting over the body 32 and the skirt 30 is a flexible wall 37 similar in construction to the flexible wall 20. One end of the wall 37 is flanged inwardly and clamped between portions of the body 32 and the cap 34. The other end of the wall 37 is flanged outwardly and clamped, together with the end of the flexible wall 20, between portions of the shell 13 and the base 14.

The body 32 is centrally bored to slidably receive a piston 42 which is suitably sealed therein to prevent leakage around the same. A calibrated spring 44 is interposed between the end of the bore and the piston. The central bore of the skirt portion 30 is of reduced diameter, to retain the piston 42 and an axial projection 46 of the piston 42 extends through the skirt portion 30 and top of the pedestal 15. The pedestal 15 is provided with a packing ring 48, which seals the end of the valve stem 10 when the base 14 is threaded thereon and the projection 46 may pass through the ring 48 and engage the stem of valve insides 11.

The plunger 18 and the plug 23 together form one weighted member and the skirt portion 30, the body portion 32 and the cap 34 together form another weighted member. These members are both urged away from the valve stem in a position of rest, and for this purpose a helical spring 49 is fitted in the space between the flexible wall 20 and the shell 13 with one end supported by the shell and the other end engaging the inside of the plunger 18. Similarly, the inner weighted member is urged away from the valve stem by a helical spring 50 which surrounds the pedestal 15 and has one end engaging the base 14 and the other end engaging the skirt of the portion 30. The space between the flexible wall 20 and the shell 13, which contains the spring 49, is filled with a liquid, preferably glycerine, for a purpose which will hereinafter appear.

The end of the shell 13 remote from the valve stem is provided with an air inlet 55, which in the position shown in Fig. 1, is sealed by a packing disk 56 carried by the plunger 18. In the position shown in Fig. 2, inlet 55 is unsealed, and air therefore may pass through an air passage 57 in the plug 23, controlled by a check valve 58, to the interior of the cap 34. From this point the air may pass through a lateral passage 59 into the collapsible chamber enclosed by the flexible wall 20.

A check valve 60 is provided for the bore in the cap 34, which when opened permits the passage of air to the space 61 between the cap 34 and the body 32, from which the air may pass through an air passage 62 in the body 32, adapted to register with an air passage 63 in the piston 42, which passage extends through the projection 46. When the passage 62 is in communication with the passage 63, as shown in Fig. 1, air may pass therefrom to the interior of the packing ring 48 and thus pass into the valve stem 10.

In operation, bearing in mind that the valve stem 10 projects inwardly through the rim of the wheel on which the tire is mounted, and that the tire inflating device is therefore located inside of the rim, an increase of speed of the vehicle will increase the centrifugal force of the weighted members and consequently urge the same toward the valve stem 10. The spring 50 is much weaker than the spring 49 so that the inner weighted member will move toward the valve stem before the plunger 18 can overcome the resistance of the stronger spring. This inward movement causes the projection 46 to engage the stem of valve insides 11 and thus open the valve and afford communication to the interior of the tire. When the centrifugal force overcomes the resistance of the stronger spring 49, the plunger 18 will move toward the valve stem, with the result that the incompressible liquid will cause the wall 20 to be contracted inwardly to the position shown in Fig. 2, in which it may contact with the inner flexible wall 37. It wll be noted that the collapsible chamber is so reduced in volume as to greatly increase the pressure therein, which pressure will be transmitted through the passage 59, valve 60, chamber 61, and air passages 62, 63 into the interior of the tire. A decrease in speed of the vehicle, conversely, will reduce the centrifugal force and permit the springs 49 and 50 to return the parts to the position shown in Fig. 1. It is obvious that a repetition of the cycle of operations described above will cause inflation of the tire and increase the pressure therein.

It is, of course, desirable to maintain the pressure in the tire approximately at a predetermined amount, and to prevent substantial over-inflation of the tire. The pumping action described above will increase the pressure, and to avoid substantial over-inflation, the spring 44 is selected as having a predetermined pressure rating approximately equal to the desired inflation of the tire. Thus, when the desired pressure is reached within the tire, this pressure will be imposed upon the valve insides 11 and the stem thereof. Thus, upon movement of the inner weighted member toward the valve stem, when the projection 46 engages the stem of the valve insides 11, the spring 44 will yield and the plunger 42 will move into the bore of the body 32, without opening the tire valve. It is appreciated that the plunger 42 is subject to varying amounts of centrifugal force at different speeds of rotation of the wheel and that therefore the spring 44 can not be so accurately calibrated as to allow the valve to close exactly at the desired pressure of inflation. However, it is possible to so calibrate the spring that the relatively immaterial variations in centrifugal force acting on the plunger 42 will not sufficiently disturb the functioning of the device to prevent the same from being operative within practical limits of accuracy, as for example, within a pound or two of the desired pressure of inflation. When the tire has been inflated approximately to the desired degree as described, and the spring 44 yields to prevent further inflation, it is desirable to prevent deflation of the tire by leakage of the valve insides. This is accomplished automatically by the movement of the piston 42 to compress the spring 44 inasmuch as the passage 63 moves out of register with the passage 62 and thus seals the tire valve stem against leakage of the valve insides. This condition is shown in Fig. 3.

It should be noted that the valve insides is opened mechanically by the plunger 46, which preserves the desired accuracy regardless of variation in the pressure rate of the valve insides. This is of advantage in that, if the valve insides were merely opened by the pumped air, a difference in the pressure rate of the valve insides spring would produce a very noticeable variation in the tire pressure ultimately obtained.

A modified form of the invention is illustrated in Fig. 4, in which the action of the flexible wall more closely approaches that of a bulb. In this form, the casing 113 receives a plunger 118, and a flexible wall 120 is clamped between the plunger 118 and the plug 123. The other end of the wall 120 is clamped between a second plunger 130, which is also in sealing engagement with the casing 113 by means of packing rings 119. The end of the wall 120 is clamped between the second plunger 130 and the flange of the body member 132. The heavier spring 150 is inside, rather than outside, of the wall 120, and the lighter spring 149 is interposed between the plunger 130 and the base 114. Otherwise the construction and operation of this form is so similar to that described in connection with the preceding figures, that further description is deemed superfluous.

While a plurality of embodiments of the invention have been illustrated and described in such detail as to enable any one skilled in the art to practice the invention, nevertheless it is to be understood that the invention is not to be limited to the details disclosed, other than as necessitated by the development of the prior art; but, instead, the invention embraces such embodiments of the board idea as fall within the scope of the appended claims, it being obvious that various changes may be made in the disclosed embodiments without departing from the spirit of the invention.

Having thus described our invention, we claim:

1. In combination with a tire valve stem, a tire pump comprising a pair of weights movable upon the creation of centrifugal forces, means responsive to movement of one of said weights by centrifugal force for opening the tire valve, and means responsive to movement of the other of said weights for forcing air into the tire.

2. In combination with a tire valve stem, a tire pump comprising a plurality of weights movable upon the creation of centrifugal forces, means responsive to movement of one of said weights by centrifugal force for forcing air into the tire, and means responsive to movement of another of said weights by centrifugal force for opening the tire valve, said means including a connection yieldable in response to an approximate predetermined pressure, whereby movement of said weight is prevented from opening said valve after the tire is inflated to approximately said predetermined pressure.

3. In combination with a tire valve stem, a tire pump comprising inner and outer parts movable by centrifugal force, means responsive to movement of one of said parts for opening the tire valve, and means responsive to movement of the other of said parts for forcing air through said stem.

4. In combination with a tire valve stem, a tire pump comprising telescoping weights movable by centrifugal force, means responsive to movement of one of said weights for opening the tire valve, and means responsive to movement of the other of said weights for forcing air through said stem.

5. In combination with a tire valve stem, a tire pump comprising a casing connected to said stem, a plunger in said casing, a flexible wall connected to said plunger defining with said casing an annular space containing a liquid.

6. In combination with a tire valve stem, a tire pump comprising a casing connected to said stem, a plunger in said casing, a flexible wall connected to said plunger defining with said casing an annular space containing a liquid, and a spring for biasing said plunger for holding said wall taut.

7. In combination with a tire valve stem, a tire pump comprising a casing connected to said stem, a plunger in said casing, a flexible wall connected to said plunger defining with said casing an annular space adapted to contain a liquid, an independently movable weight arranged within said wall and inwardly of said plunger and provided with a flexible wall defining with said first named flexible wall, said plunger and said weight, a flexible chamber, and means in said weight for conducting fluid forced from said chamber upon the contraction of the same to said valve stem.

JOHN C. CROWLEY.
ARTHUR P. WILLIAMSON.